Jan. 14, 1936.  D. GREGG  2,027,819
INTERNAL COMBUSTION ENGINE
Filed March 6, 1931  2 Sheets-Sheet 1

INVENTOR
David Gregg.
BY
F. B. Smith
ATTORNEY

Jan. 14, 1936. D. GREGG 2,027,819
INTERNAL COMBUSTION ENGINE
Filed March 6, 1931 2 Sheets-Sheet 2
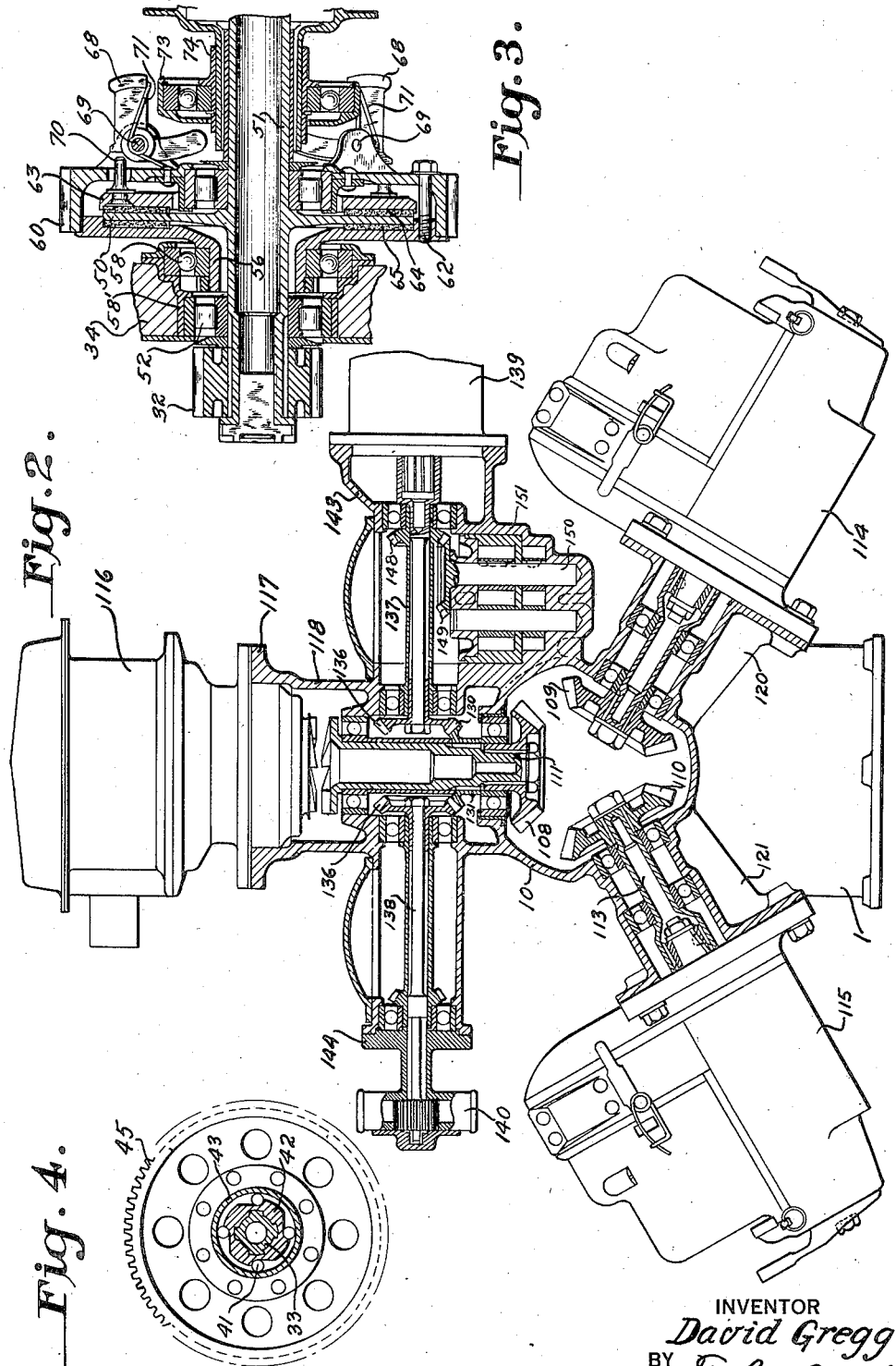
INVENTOR
David Gregg.
BY
F. B. Smith
ATTORNEY Patented Jan. 14, 1936

2,027,819

UNITED STATES PATENT OFFICE 2,027,819

INTERNAL COMBUSTION ENGINE

David Gregg, Caldwell, N. J., assignor to Eclipse Aviation Corporation, East Orange, N. J., a corporation of New Jersey Application March 6, 1931, Serial No. 520,650

4 Claims. (Cl. 123—195)

This invention relates to internal combustion engines and particularly to means for controlling the operation of the accessory mechanisms associated with engines such as those used in aeronautical and other automotive devices.

An object of the invention is to provide novel means for controlling the pressure of the combustible charge passing into the cylinders of an internal combustion engine.

Another object of the invention is to provide a novel supercharger driving mechanism by which the volume of air compressed and fed to the engine may be properly regulated.

Another object is to provide in a device of the foregoing character novel means for actuating the supercharger at different speeds to compensate for changes in the speed of the engine, or for changes in atmospheric pressure.

A further object of the invention is to provide novel mounting and driving means for a multispeed supercharger employing a plurality of impeller units capable of joint operation and control.

A further object of the invention is to provide novel means for multiplying the speed of a supercharger when the craft associated therewith passes into regions of rarefied air, such as are encountered by airplanes at high altitudes.

Another object of the invention is to provide novel supercharger driving means involving the use of a plurality of sets of gearing constantly in driving engagement with a common drive shaft, each of said sets of gearing being provided with a clutch mechanism and means for rendering one of said clutch mechanisms ineffective as a driving agency upon the shifting of the companion clutch mechanism into driving relation to said common drive shaft.

A further object of the invention is to provide novel companion clutch mechanisms of the foregoing character, one of which is permanently positioned with respect to the remainder of the driving mechanism, and the other of which is movable at will into and out of driving relation to the driven members of the mechanism.

Still another object of the invention is to provide in a supercharger driving mechanism of the foregoing character, a novel set of companion clutch mechanisms, one of which constitutes a one-way driving connection which is adapted to be overrun upon movement of the companion clutch mechanism into driving position.

Another object of the invention is to provide in a mechanism involving such a combination of clutch mechanisms, a manually shiftable clutch of novel construction in which the effectiveness of the driving relation between the driving and driven members depends upon the speed of rotation of said members.

Another object of the invention is to provide in a driving mechanism capable of general application, novel means for obtaining different speeds and driving ratios at will, or in accordance with a predetermined plan of operation.

A further object of the invention is to provide in combination with an internal combustion engine having associated therewith a supercharger, a current generator, and ignition controlling unit, and other accessories, novel unitary driving means for all or any desired combination of such engine accessories.

A further object of the invention is to provide novel driving mechanism for engine accessories of the foregoing character so constructed and positioned as to form a compact symmetrical and concentric assembly of practical, efficient and compact construction and of relatively light weight and simplicity of manufacture, and in which the component parts are easily installed and readily accessible for inspection, repair or removal.

These and other objects of the invention will become apparent upon inspection of the following specification and the accompanying drawings, wherein is illustrated the preferred embodiment of the invention. It is to be expressly understood, however, that the drawings are intended merely to serve as an illustration of one mode of embodying the invention in a practical form and are not designed as a definition of the limits of the invention, reference being had for this purpose to the appended claims.

In the drawings,

Fig. 2 is an elevation view taken at right angles to the view point of Fig. 1 with certain of the parts shown in vertical section along the line 2—2 of Fig. 1;

Fig. 3 is an enlarged sectional view of the centrifugal clutch mechanism;

Fig. 4 is a transverse sectional view along the line 4—4 of Fig. 1.

Figure 1:
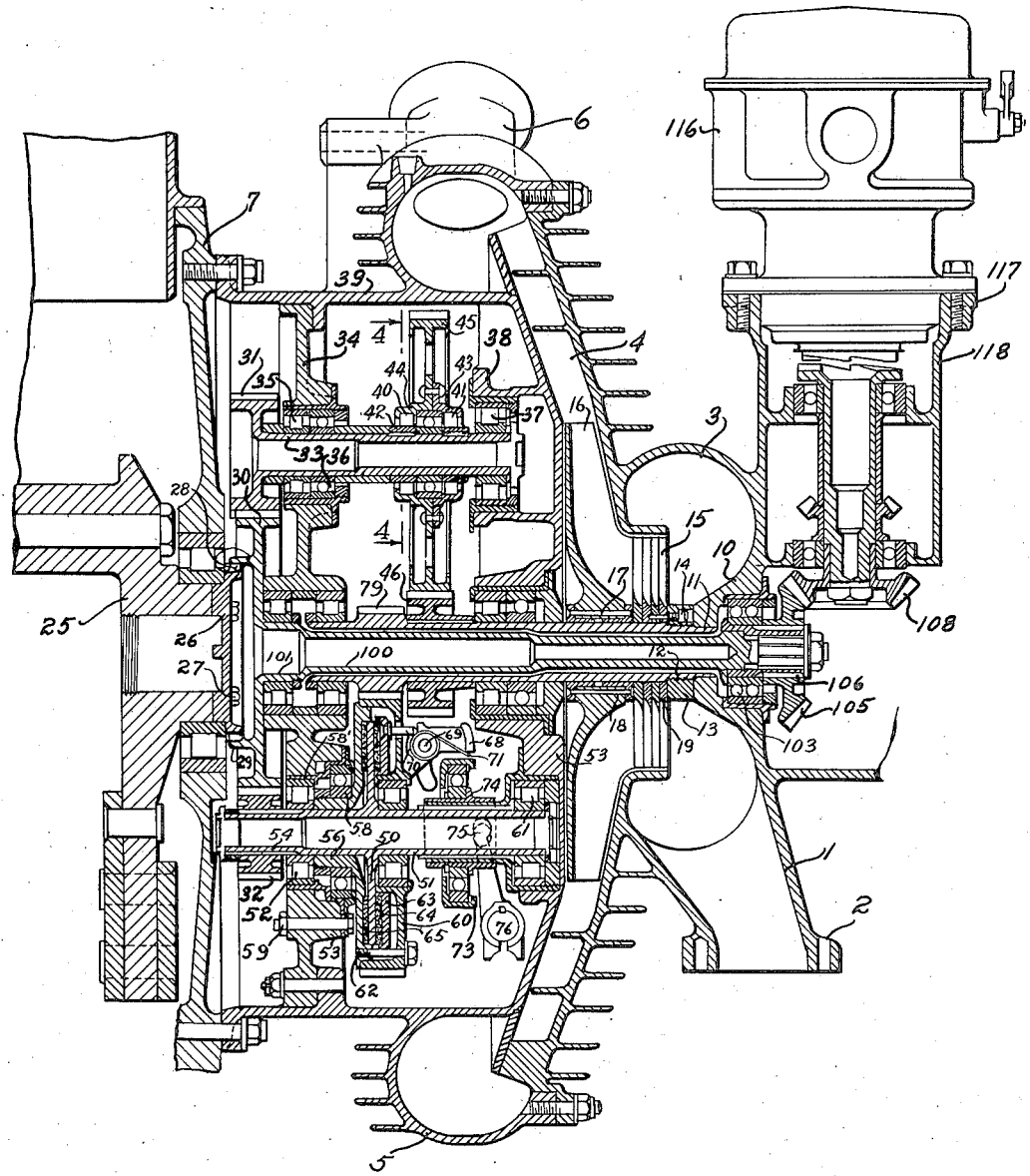
Fig. 1 is a central vertical section of a device embodying the invention.

Referring to the drawings, and particularly to Fig. 1, the invention is shown embodied in a supercharger assembly to which air may be admitted through a suitable entrance duct 1 provided with suitable means 2 for attachment to and communication with the carburetor or other device through which the air passes prior to entry into the chamber 3, the latter constituting the entrance chamber of the supercharger, the exit chamber being indicated at 4 wherein it is shown as taking the form of a forwardly extending cylindrical chamber having communication with an intake manifold 5 from which emanate the radially disposed ducts 6 leading to the combustion chambers of the engine, the crank case of which is indicated at 7.

The supercharger proper may be of any desired construction, but as illustrated herewith, is preferably of the type employing a centrifugal impeller in combination with a plurality of propeller blades disposed in series relation in advance of the centrifugal impeller and at the exit of the chamber 3, which chamber receives the combustible charge for the engine from the carburetor and/or other conditioning apparatus (not shown) which may or may not include temperature controlling means. As shown, the chamber 3 is provided with an inwardly extending boss 10 having a central opening therein through which passes the end of a hollow shaft or sleeve 11, the latter being provided with a threaded portion 12 engaging with a correspondingly threaded surface provided on a cylindrical nut or collar 13 through which passes a screw 14 or other suitable means for maintaining in place a plurality of propeller blades 15, constituting a velocity producing element of the supercharger. These propellers 15 are preferably disposed in staggered radial relation and each comprises a blade that is preferably of airfoil section and of selected pitch whereby large quantities of fluid may be delivered to chamber 4.

Suitable means are provided for imparting a final acceleration and velocity increment to the fluid, and at the same time (where the invention is applied to an internal combustion engine) causing diffusion thereof, so that the mixture upon entering the intake manifold of the engine will possess maximum combustion qualities. To this end a centrifugal impeller 16 is located preferably directly adjacent the last propeller 15, and is provided with blades so shaped and disposed that the impinging fluid stream will be moved radially outward into the diffusing chamber 4 at a considerably accelerated velocity, and at a pressure greater than that attained during passage through the first impeller element 15.

From the foregoing, it will be evident that on actuation of the supercharger assembly in response to rotation of shaft 11 by the novel driving means to be described, the combustible mixture to be supplied to the engine is drawn from the carburetor and/or other preliminary devices into the chamber 3 at a high rate of speed induced by the suction created by the rotation of propellers 15. In consequence of this action, the mixture is delivered against impeller 16 with not only increased velocity, but also at considerable increase in pressure. Further increases in velocity and pressure occur as the mixture passes the impeller 16, by virtue of the construction of the blades thereof, as above explained.

Having described the supercharger proper—which constitutes part of the present invention only in so far as it is combined and operatively associated with the novel driving means therefor—such novel driving means will now be described. As above stated, the driving means preferably comprises a plurality of independently effective clutch mechanisms, each incorporated in a speed multiplying mechanism, each of which speed multiplying mechanisms is preferably held in permanently meshed relation to a member drivably connected to the engine crankshaft, shown at 25. As illustrated in Fig. 1, the driving connection from the crankshaft 25 preferably takes the form of a gear 26 secured thereto by suitable means as indicated at 27, the gear being provided with teeth adapted to drivably engage similar teeth or splines 28 formed on a circular flange 29 provided on a gear 30, the latter meshing with gear 31 on the one hand and pinion 32 on the other. As shown, gear 31 is provided with an elongated hub 33 constituting a hollow shaft rotatably supported in a transversely disposed dividing wall 34 of the casing 39 by the provision of suitable bearing members 35 and 36, the opposite end of the shaft being similarly supported in a bearing 37 formed by the inwardly extending hub or boss 38 constituting an integral part of the casing 39.

The means for establishing a one-way driving connection between the hollow shaft 33 and the sleeve 11 comprises the provision of a one-way wedging clutch mechanism consisting of a plurality of pins or rollers 40 and 41 disposed in suitable recesses (Fig. 3) provided about the circumferential surface of sleeve 42 on either side of a bearing 43, the said rollers being adapted to move into wedging relation to the hub 44 of a gear 45 in response to rotation of the hollow shaft 33 in one direction. When gear 45 is rotated at a speed in excess of that of shaft 33, in a manner to be described, the said rollers 40 and 41 are adapted to rotate freely, thereby permitting relative rotation of shaft 33 and gear 45. The gear 45, as shown, meshes with the pinion 46 secured rigidly to the sleeve 11.

From the foregoing it is evident that in the absence of any force tending to drive the gear 45 through other means, the rotation of shaft 33 produced by virtue of its geared connection with the engine crankshaft 25 will be effective through the clutch 44 and gears 45 and 46, to rotate sleeve 11, and hence the supercharger assembly, to produce the necessary compression of the combustible mixture passing to the engine cylinders; and it is contemplated that the drive for the supercharger will be as just described, as long as the craft is travelling in relatively normal atmospheres, such as those encountered at relatively low altitudes. When, however, the craft attains a relatively high altitude, the novel means now to be described are adapted to become effective to drive the supercharger at considerably higher speed, thereby obtaining an increased compressing action to compensate for the decrease in atmospheric pressure at such high altitude.

When such high altitude is reached, it is desirable to provide means whereby the operator may render the means last referred to effective to drive the supercharge at an increased speed. The preferred means for effecting this result comprises, as shown, a yielding clutch mechanism consisting of a circular disc 50 (Figs. 1 and 4) rigidly fixed to or forming an integral part of shaft 51, the disc being disposed at substantially right angles to the axis of the shaft. The latter is rotatably supported near its outer end in bearing 61 mounted in a recessed hub 53 formed in the casing 34, and is provided with a splined portion 54 for rotation with the pinion 32. The shaft 51 extends through a hub 56 of a member 57 having a gear 60 rigidly fixed to the outer face thereof by suitable means such as bolts 61, the inner end of hub 56 being rotatably supported in bearing 58 mounted in a suitable bracket secured on wall 34 by through bolts 59, and retained in its proper position by means of a cylindrical retaining sleeve 58'. The latter is provided with an extension in which is mounted a bearing 52 for the shaft 51.

The outer periphery of the gear 60 is provided with an inwardly extending annular flange spaced apart from, and forming a recess adjacent, the outer face of a disc member 63. The inner face of the disc 63 is provided with an annular frictional element 64 secured thereto, a second annular disc 65 being provided on the opposite side of disc 50. The opposed faces of the frictional elements 64 and 65 are thus adapted to frictionally engage a portion of the disc 50 adjacent its periphery and to permit relative rotation therebetween so long as the clutch is in open position.

The frictional engagement of the clutch elements is obtained by means of pivoted bell crank levers 68, the outer arms of which are enlarged to form centrifugal weights. Levers 68 are pivotally mounted on suitably journaled axles 69 carried by member 60. Means are provided on the rocking levers for engagement with longitudinally movable pins 70, the inner ends of said pins having engagement with disc 63, spring means 71 being provided, preferably to constantly urge the levers into contact position with a predetermined pressure. Likewise, the clutch faces may, if desired, be so designed as to constantly exert a small amount of frictional pressure, one against the other, even when the weighted levers are in non-driving position.

Any suitable number of weighted levers are employed to distribute the pressure uniformly about the clutch discs. The levers may be moved about their pivots by moving thrust bearing 73 outwardly into engagement with the inner arms of the bell crank levers. Any convenient manual or power means may be employed for actuating a sleeve member 74 to move the bearing 73 into or out of contact with the levers. As shown, such means includes a pin and slot connection 75 between sleeve 74 and a lever 76 having a hub for reception of a suitable operating shaft (not shown).

During normal operation, as above explained, the supercharger is driven through the wedging clutch mechanism 44, which therefore constitutes a constantly operable means for supplying compressed fuel to the engine cylinders in the manner and way of the path above traced. During such operation the yielding clutch mechanism, last described, remains in disconnected relation with respect to the supercharger driving sleeve 11. When an altitude is reached such that the supercharger is no longer effective to maintain the desired pressure in the intake manifold of the engine, member 76 may be actuated to move bearing 73 out of engagement with the inner arms of levers 68 to thereby permit free action of the centrifugal weights to engage the clutch and form a positive driving connection from the gear 30 to the supercharger sleeve 11 by way of the pinion 32, hollow shaft 51, clutch 50, and gear 60, the latter being enmeshed with the teeth formed on the enlarged portion of the sleeve 11 as indicated at 79.

Upon establishment of the driving connection just described, the driving ratio of which is considerably greater than that of the mechanism associated with the wedging clutch 44, the speed of rotation of the supercharger units is correspondingly increased with a resultant rise in the pressure available in the engine cylinders. When this action occurs, the gear 45, which remains enmeshed with the gear 46 the speed of which has been increased by virtue of its rigid connection with sleeve 11, tends to become the driving member with respect to the shaft 33 with the result that the gear 45 overruns said shaft by virtue of the overrunning connection constituted by the clutch 44 as above described. The shaft 33 therefore becomes ineffective as a supercharger driving agency although continuing to rotate by virtue of its permanent meshing engagement with the gear 30. Hence, upon release of the clutch 50, the shaft 33 again becomes effective to drive the supercharger at a normal speed.

As above stated, a further object of the invention is to provide unitary driving means for the various engine accessories used in addition to the supercharger and to so dispose and position such accessories and driving means as to form a compact symmetrical and concentric assembly affording easy access to each of the units. As shown, such novel means preferably includes the provision of a second driving shaft 100 preferably constituting an elongated extension of the hub 101 of gear 30 and extending through the sleeve 11 in coaxial relation thereto, the outer end of the shaft being rotatably supported, with the assistance of bearings 103, in a recessed portion formed in the previously described hub 10 of the supercharger casing. At its outer end there is preferably provided a bevel gear 105 drivably secured to the shaft by suitable key or splines as indicated at 106, the gear 105 being adapted to mesh with suitable bevel gears 108, 109 and 110 (Fig. 2), the latter gears being suitably secured in driving relation with the shafts 111, 112 and 113 respectively, the latter two constituting driving means for magnetos 114 and 115 respectively, and the former constituting a crankshaft through which the engine crankshaft 25 is initially turned over to start the engine by application thereto of the starting torque generated in the starting unit 116.

The starting unit just referred to, which may be of any suitable construction, is preferably secured to a flange 117 formed on the hub 118, extending radially from the centrally disposed casing, each of the units 114 and 115 being similarly secured on hubs 120 and 121 respectively, each of which also radiates from the central casing 10. As shown, the hubs 118, 120 and 121 are so disposed that their axes constitute equally spaced radial lines located in a plane at right angles to the axis of the driving shaft 100. Such arrangement not only provides for symmetry and efficiency of operation, but also economizes in the space required for installation of the engine as a whole.

The novel unitary mounting and driving means further comprises, in the preferred embodiment as illustrated, the provision of a second bevel gear 130 formed on the sleeve 131 splined to the drive shaft 111, the gear 130 being adapted to mesh with bevel gears 135 and 136 secured to shafts 137 and 138 respectively, the former constituting the driving means for generator 139 and the latter the driving means for the engine pump 140. As shown, each of the units 139 and 140 is detachably connected to the assembly by the provision of suitable means adapted to fasten to the oppositely disposed casings 143 and 144 which extend radially outward from the casing 118. The drive shaft 137 is in turn preferably provided with a second bevel gear 148 adapted to drive the bevel gear 149 secured to a shaft 150 operating a geared pumping mechanism enclosed in a casing 151 constituting an integral part of casing 10.

From the foregoing, it will be apparent that the invention above described provides novel means for driving an engine supercharger at different speeds which may be employed alternately under the control of and at the will of the operator and that there is further provided novel unitary mounting and driving means for such a supercharger, as well as for the other engine accessories commonly employed in association with internal combustion engines, which novel mounting and driving mechanism is so constructed and positioned as to form a compact symmetrical and concentric assembly of practical, efficient and compact construction and of relatively light weight and simplicity of manufacture, and in which the conforming parts are easily installed and readily accessible for inspection, repair or removal.

It is to be understood that the invention may be applied to other uses, and that changes may be made in the embodiment of the invention to suit different requirements or for other reasons. Thus, the invention is not confined to the use of any particular supercharger units or to any particular relative arrangement between the location of the supercharger and the other devices through which the combustible charge or combustion supporting air passes. Likewise, it is to be understood that the novel supercharger driving mechanism, herein disclosed, may be used independently of the novel accessory driving and mounting means and conversely, the latter features may be employed independently of the former. It is preferable, however, to utilize both features in the single unitary construction herein disclosed, as such construction is known to be of considerable practical merit and possesses many advantages in addition to those especially recited herein.

Likewise other changes, modifications, substitutions, additions and omissions may be made in the construction, arrangement, manner of operation, and application of the parts, without departing from the limits or scope of the invention as defined in the appended claims.

What is claimed is:

1. In combination with an internal combustion engine having a crankcase and a crankshaft, a unitary supporting member detachably secured thereto comprising a housing constituting an extension of said crankcase, a shaft having a slidable driving connection with the crankshaft rotatably mounted in said housing, a plurality of engine accessories supported on said housing, a gear on said shaft, driving gears for said accessories meshed with and spaced about the periphery of said shaft gear, a sleeve rotatably mounted on the shaft, a supercharger on the sleeve and driven thereby, a gear train connecting the sleeve with the shaft, said sleeve and gear train being positioned between the accessories and the engine, and said housing, said supercharger, said sleeve, said gear train and accessories being detachable as a unit from said crankcase.

2. In combination with an internal combustion engine having a crankcase and a crankshaft, a unitary supporting member detachably secured thereto comprising a housing constituting an extension of said crankcase, a shaft having a slidable driving connection with the crankshaft rotatably mounted in said housing, a supercharger, driving means therefor including a sleeve rotatably mounted on the shaft, gear means connecting the sleeve with the shaft for driving the sleeve at a greater speed than the shaft, a plurality of engine accessories supported on said housing, a bevel gear mounted on said shaft at a point beyond the sleeve, a bevel gear for each accessory mating with the shaft bevel gear, said gears having their axes extending radially of said shaft, and said housing, said supercharger and driving means, said accessories and driving shaft being detachable from the crankcase as a unit.

3. In combination with an internal combustion engine having a crankcase and a crankshaft having a toothed end portion, a housing secured to the crankcase, a driven shaft in the housing, a gear on the shaft having a toothed socket engaging the toothed portion of the crankshaft, a countershaft in the housing having a gear meshed with the driven shaft gear, a sleeve rotatably mounted on the driven shaft, a supercharger secured to the sleeve, gear means connecting the countershaft with the sleeve, said driven shaft extending through the housing and having a bevel gear secured to the end of the shaft, a plurality of engine accessories mounted on the housing, radial shafts for said accessories having bevel gears meshed with said driven shaft bevel gear, and said housing, said shaft and all parts driven thereby being removable as a unit from said crankcase.

4. In combination with an internal combustion engine having a crankcase and a crankshaft projecting through the end thereof, a unitary supporting member detachably secured to the crankcase comprising a housing constituting an extension of said crankcase, a driven shaft rotatably mounted in said housing having a slidable driving connection with the crankshaft, an engine accessory in said housing concentric with said shaft and rotatable relatively thereto, driving means in said housing for said accessory comprising a sleeve enclosing the driven shaft, said sleeve having a geared connection with the driven shaft whereby the sleeve is rotated at a speed different from that of the driven shaft, a plurality of other accessories supported by the housing, driving shafts for the said other accessories having geared connections with the driven shaft at a point beyond the sleeve, said driving shafts extending radially from said driven shaft, and said housing, said driven shaft and all of said accessories being detachable as a unit from said crankcase.

DAVID GREGG.